Figure 1:
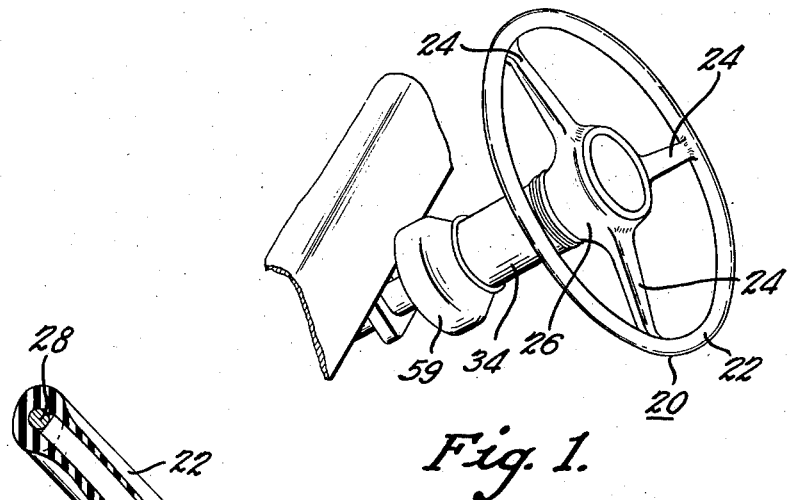

July 18, 1939.  H. D. GEYER  2,166,290

STEERING WHEEL ASSEMBLY

Filed Jan. 10, 1938

INVENTOR
Harvey D. Geyer
BY
Spencer Hardman & Fehr
his ATTORNEYS

Patented July 18, 1939

2,166,290

UNITED STATES PATENT OFFICE 2,166,290

STEERING WHEEL ASSEMBLY

Harvey D. Geyer, Dayton, Ohio, assignor to General Motors Corporation, Detroit, Mich., a corporation of Delaware Application January 10, 1938, Serial No. 184,129

6 Claims. (Cl. 74—552)

The invention relates to steering wheels for automobiles and the like and more particularly to steering wheels that are resiliently attached to the steering column.

The object of this invention is to provide a resilient connection between the steering wheel and the steering column, said resilient connection being of sufficient length to permit bodily movement or translation of the steering wheel with respect to the steering column.

Further objects and advantages of the present invention will be apparent from the following description, reference being had to the accompanying drawing wherein a preferred embodiment of the present invention is clearly shown.

Figure 2:
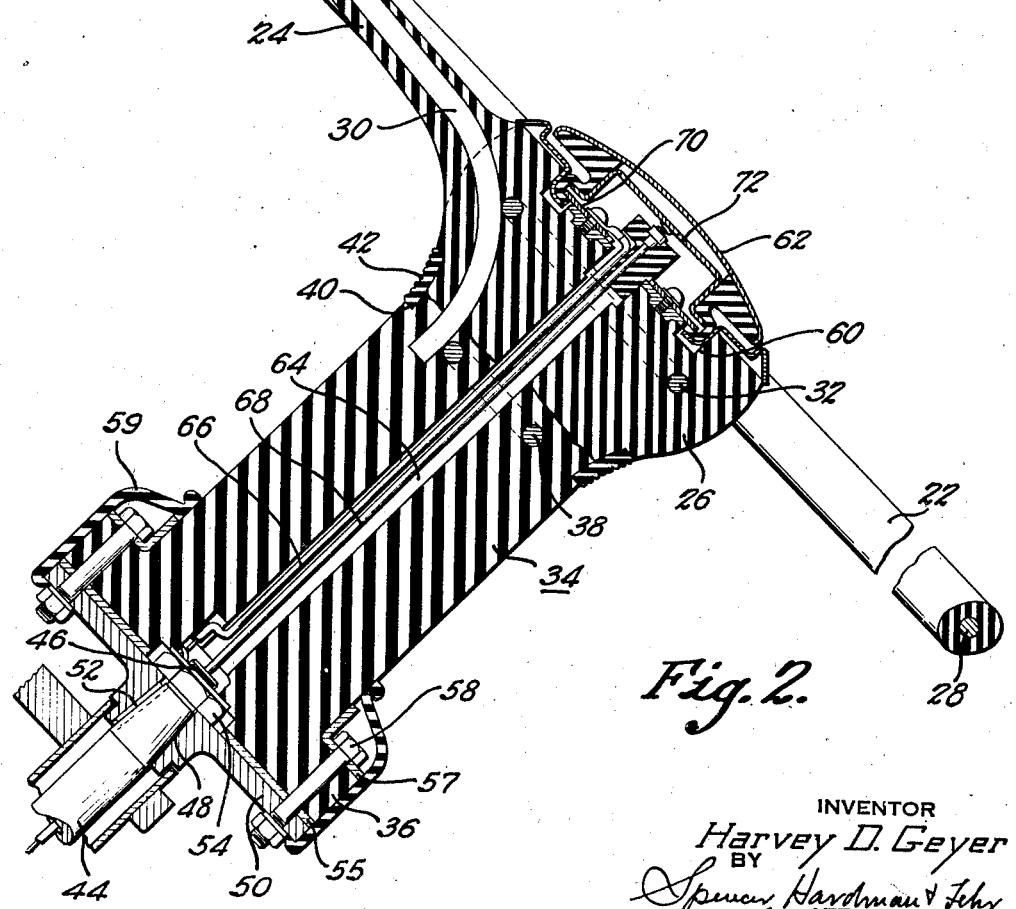

In the drawing:

Fig. 1 is a fragmentary view, in perspective, showing a steering wheel assembly connected to a steering column of an automobile, or the like, and Fig. 2 is an enlarged sectional view of the improved steering wheel assembly connected to a steering column.

Referring to the drawing, a steering wheel assembly 20 is shown, which includes a ring or rim 22, a plurality of spokes 24, and a hub portion 26. The rim 22, spokes 24 and hub 26 are fabricated from rubber having a very low degree of resiliency, such rubber commonly being known as hard rubber. In order to strengthen the steering wheel a circular ring of metal 28 is molded within the rim 22 and a plurality of reinforcing members 30 preferably welded or otherwise connected to the ring 28, are disposed within the spokes 24. The reinforcing members 30 are bent outwardly adjacent the hub portion 26 of the wheel assembly and are of sufficient length to extend outwardly from the hub 26. In the preferred form a reinforcing ring 32 is molded within the hub portion 26 and is preferably, prior to the molding operation, welded or otherwise suitably joined to the reinforcing members 30. From the foregoing it will be observed that the steering wheel which includes the rim 22, spokes 24 and hub 26 is a substantially rigid assembly.

In order to provide a resilient connection between the steering wheel and the steering column an elongated resilient rubber hub portion 34 is provided. Portion 34 is molded to include a flange 36 at one end thereof, the function of which will be explained in detail hereinafter.

The extending portions of reinforcing members 30 are preferably welded to a ring 38 which ring 38 and extending portions of member 30 are then molded within the resilient rubber hub portion 34, the joint between the hub portion 34 and hub portion 26 being vulcanized in any suitable manner to provide a strong bond therebetween. Thus the reinforcing members 30 and ring 38 aid in strengthening the vulcanized connection or bond between the hub portion 26 and the hub portion 34.

In the preferred form, a groove 40 is molded around the periphery of the hub portions 26 and 34 at the junction thereof, and a soft rubber band 42 is snapped into said groove 40 and thereby conceals the joint between the hard and soft rubber portions of the hub.

A steering column 44, screw threaded at the outer end thereof at 46 is provided and includes a tapered portion 48 adjacent the screw threaded end thereof. A circular plate 50 of substantially the same diameter as flange 36 of hub 34 is slipped over the tapered portion 48 and is preferably keyed thereto by a key 52. A nut 54 is then drawn tight on the threaded portion 46 thereby rigidly fastening the plate 50 to the steering column 44. An apertured plate 55 is disposed between flange 36 of hub portion 34 and plate 50, and a flanged collar 57 is provided to abut the other side of the flange 36. The collar 57, plate 55 and plate 50 associated with the steering column 44 are drilled so that the holes therethrough are in register and a plurality of bolts 58 are then passed through the holes thereby clamping the hub portions 34 and associated steering wheel to the plate 50 which is associated to the steering column 44 when the nuts associated with bolts 58 are drawn tight.

In this manner the steering wheel is connected to the steering post by means of a resilient connection which has sufficient resistance to allow rotation of the steering post, but which at the same time has sufficient length and resilience to allow substantial bodily displacement of the steering wheel away from the axis of the steering post.

In the preferred form an annular rubber cup 59 fabricated from soft rubber is used to conceal the joint between the steering wheel assembly and the steering column flange 50. The cup 59 is preferably snapped over the flange 36 of the hub portion 34 thereby concealing the heads of the bolts 58. The lower end of the cup 59 overlies the aforementioned joint between the plate 50 and the end of the hub portion 34 to give a finished appearance to the assembly.

A recess 60 in the outer end of hub portion 26, accommodates a horn button 62 and associated switching mechanism. The hub portions 26 and 34 are cored axially thereof to provide a passage 64 therethrough and two flexible insulated wires 66 and 68 pass upwardly through the passage 64. Wire 66 is grounded to the steering column at one end thereof and is connected at the other end to a switch plate 70. Wire 68 which is connected in the horn circuit at one end thereof passes through the steering column 44 and passage 60 and is connected at the other end to a switch member 72 associated with the horn button 62. Since the wires 66 and 68 are flexible and insulated it is manifest that the steering wheel can be displaced bodily around its connection with the steering column without disturbing the continuity of the horn circuit.

From the foregoing it is apparent that I have provided a steering wheel assembly that is resiliently connected to the steering column by a soft rubber hub portion of substantial length, such a connection markedly reducing the transmission of the vibrations from the engine to the steering wheel. Likewise the present steering wheel assembly may be subjected to sudden impacts, such as when the body of the driver is thrown against the wheel, and resiliently yields to such impacts without injuring the driver or harming the steering functions of the assembly. While the present steering wheel assembly is substantially flexible it is sufficiently rigid and strong to permit it to function properly as a steering wheel.

While the embodiment of the present invention as herein disclosed, constitutes a preferred form, it is to be understood that other forms might be adopted, all coming within the scope of the claims which follow:

What is claimed is as follows:

1. A steering wheel assembly comprising in combination, a steering wheel including a hub portion, a rim connected to said hub portion by a plurality of spokes, said rim, spokes and hub portion being fabricated from hard rubber, an elongated second hub portion fabricated from relatively softer rubber than the first mentioned hub portion and vulcanized at one end thereof to said first mentioned hub portion, and an integral flange at the opposite end of the second mentioned hub portion for connecting the steering wheel assembly to a steering shaft.

2. A steering wheel assembly comprising in combination, a steering wheel including a hub portion, a rim connected to said hub portion by a plurality of spokes, said rim, spokes and hub portion being fabricated from hard rubber, a second elongated hub portion fabricated from relatively softer rubber than the first mentioned hub portion and vulcanized at one end thereof to said first mentioned hub portion, an integral flange at the opposite end of the second mentioned hub portion for connecting the steering wheel assembly to a steering shaft, and a resilient rubber cup adapted to fit over the lower end of the second mentioned hub portion and conceal the joint between said second mentioned hub portion and a steering shaft.

3. A steering wheel assembly comprising in combination, a steering wheel including a hub portion, a rim connected to said hub portion by a plurality of spokes, said rim, spokes and hub portion being fabricated from hard rubber, an elongated second hub portion fabricated from relatively softer rubber than the first-mentioned hub portion and vulcanized at only one end thereof to said first-mentioned hub portion, reenforcing means molded within the rim, spokes and first-mentioned hub portion and having only a short length thereof extending into and vulcanized to said second hub portion, and a steering column connected to the other end of said elongated hub portion.

4. A steering wheel assembly comprising in combination, a wheel portion of hard rubber including a plurality of integral spokes, a hub including an elongated portion of relatively softer rubber than the wheel portion and extending outwardly a substantial distance from the plane of the wheel, reenforcing means molded within the spokes and the wheel and having a short length thereof only extending into said softer rubber hub portion for securing the wheel to the hub portion, and means for connecting the soft rubber hub portion at the outer end thereof only to a steering column.

5. A steering wheel assembly comprising in combination, a steering wheel including a hub portion, a rim connected to said hub portion by a plurality of spokes, an elongated resilient rubber portion associated at one end thereof only to said hub portion and adapted to be attached at the other end thereof to a steering column, said resilient elongated portion being sufficiently rigid to cause rotation of said steering column when the steering wheel is turned and being of sufficient length and resiliency to bend and permit the steering wheel to be bodily translated a substantial distance relative to the axis of the steering column.

6. A steering wheel assembly comprising in combination, a wheel portion having a plurality of integral spokes, said wheel and spokes being fabricated from a rigid material, a resilient elongated hub associated at one end thereof only with said wheel and spokes and adapted to be connected at the other end thereof to a steering column, said elongated resilient hub being sufficiently long and flexible to bend so as to permit bodily displacement of the steering wheel relative to the steering column.

HARVEY D. GEYER.